US008625934B2

(12) United States Patent
Chen et al.

(10) Patent No.: US 8,625,934 B2
(45) Date of Patent: Jan. 7, 2014

(54) METHOD AND APPARATUS FOR DETECTING DISPLACEMENT WITH SUB-PIXEL ACCURACY

(75) Inventors: Hsin Chia Chen, Hsin-Chu County (TW); Ming Tsan Kao, Hsin-Chu County (TW)

(73) Assignee: Pixart Imaging Inc., Hsin-Chu County (TW)

( * ) Notice: Subject to any disclaimer, the term of this patent is extended or adjusted under 35 U.S.C. 154(b) by 195 days.

(21) Appl. No.: 13/331,872

(22) Filed: Dec. 20, 2011

(65) Prior Publication Data
US 2012/0127077 A1 May 24, 2012

Related U.S. Application Data

(63) Continuation-in-part of application No. 12/020,699, filed on Jan. 28, 2008, now Pat. No. 8,090,221.

(51) Int. Cl.
*G06K 9/32* (2006.01)
(52) U.S. Cl.
USPC ........... 382/300; 382/274; 382/275; 382/291; 358/3.26; 358/3.27; 358/525
(58) Field of Classification Search
USPC ................ 382/274, 275, 278, 282, 291, 300; 358/3.26, 3.27, 525
See application file for complete search history.

(56) References Cited

U.S. PATENT DOCUMENTS

| 5,640,200 | A | 6/1997 | Michael |
| 5,729,008 | A | 3/1998 | Blalock et al. |
| 6,664,948 | B2 | 12/2003 | Crane et al. |
| 6,996,291 | B2 | 2/2006 | Nahum |
| 7,502,515 | B2 | 3/2009 | Gu et al. |
| 7,738,699 | B2 * | 6/2010 | Tsuruoka et al. ............. 382/169 |
| 7,751,645 | B2 * | 7/2010 | Reneker et al. ............. 382/275 |
| 8,111,307 | B2 * | 2/2012 | Deever et al. ................ 348/246 |
| 8,130,278 | B2 * | 3/2012 | Border et al. ............. 348/208.6 |
| 8,290,263 | B2 * | 10/2012 | Tsuruoka et al. ............. 382/169 |

FOREIGN PATENT DOCUMENTS

TW      I225622      12/2004

OTHER PUBLICATIONS

Bing Pan et al., "Development of Sub-Pixel Displacements Registration Algorithms in Digital Image Correlation", Advances in Mechanics, vol. 35, No. 3, Aug. 25, 2005.

* cited by examiner

*Primary Examiner* — Yosef Kassa

(57) ABSTRACT

A method of detecting displacement with sub-pixel accuracy includes the steps of: capturing a first array image and a second array image; interpolating the first array image to form a reference image; interpolating the second array image to form a comparison image; comparing the reference image with the comparison image so as to obtain a displacement. The present invention also provides an apparatus for detecting displacement with sub-pixel accuracy.

24 Claims, 18 Drawing Sheets

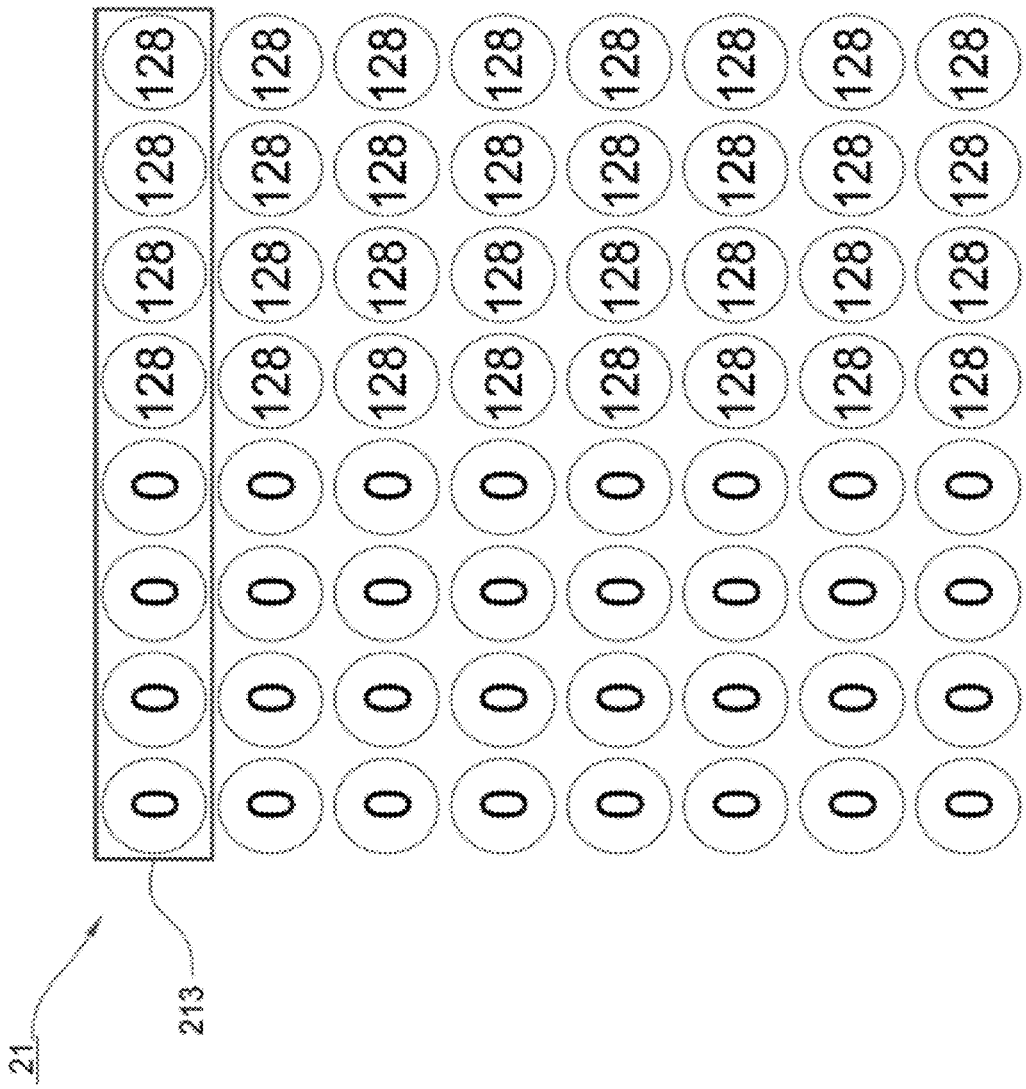

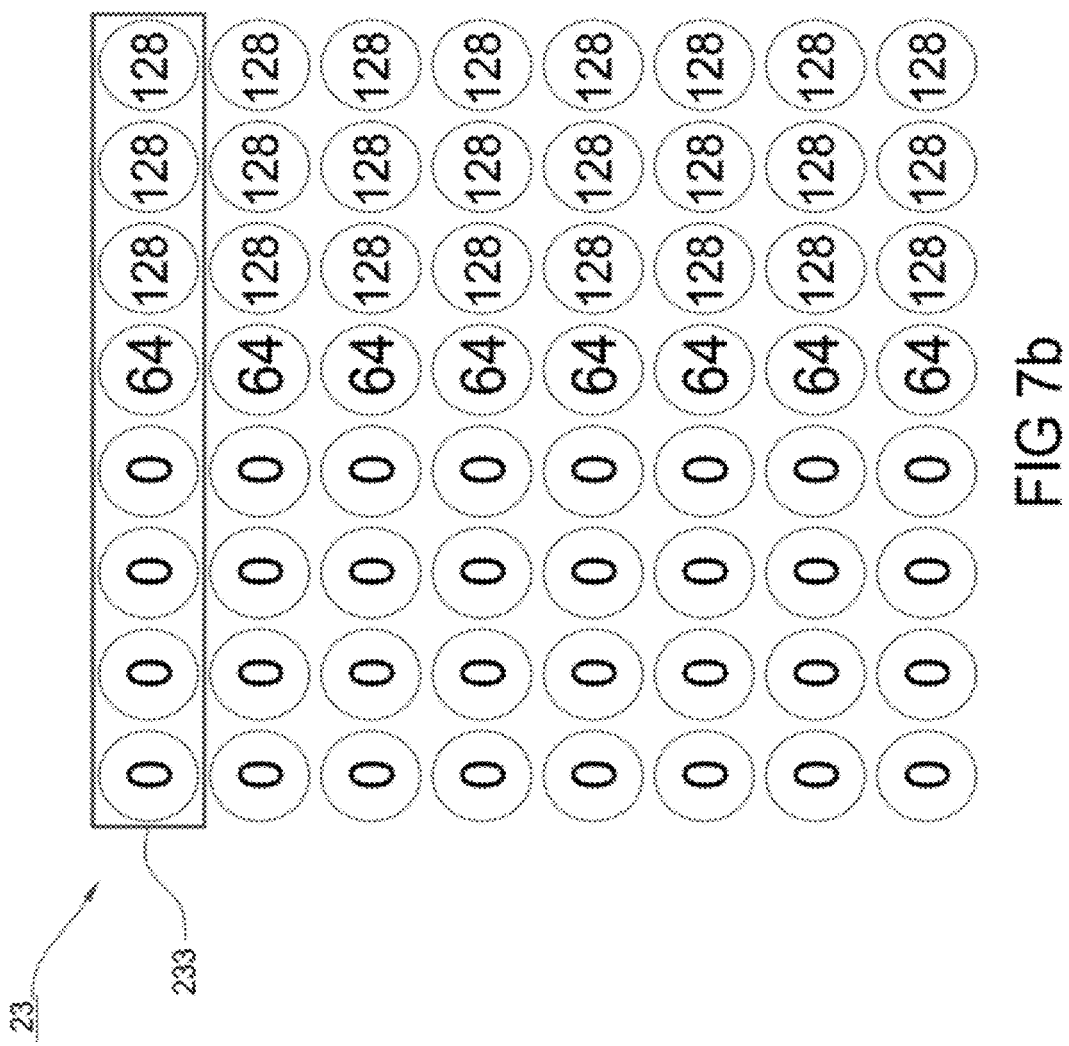

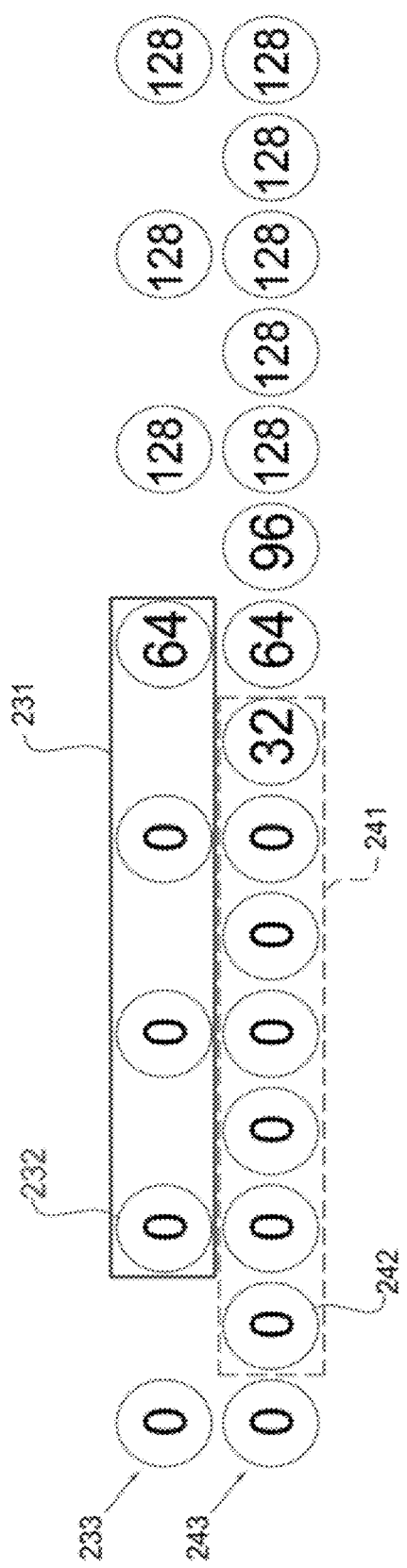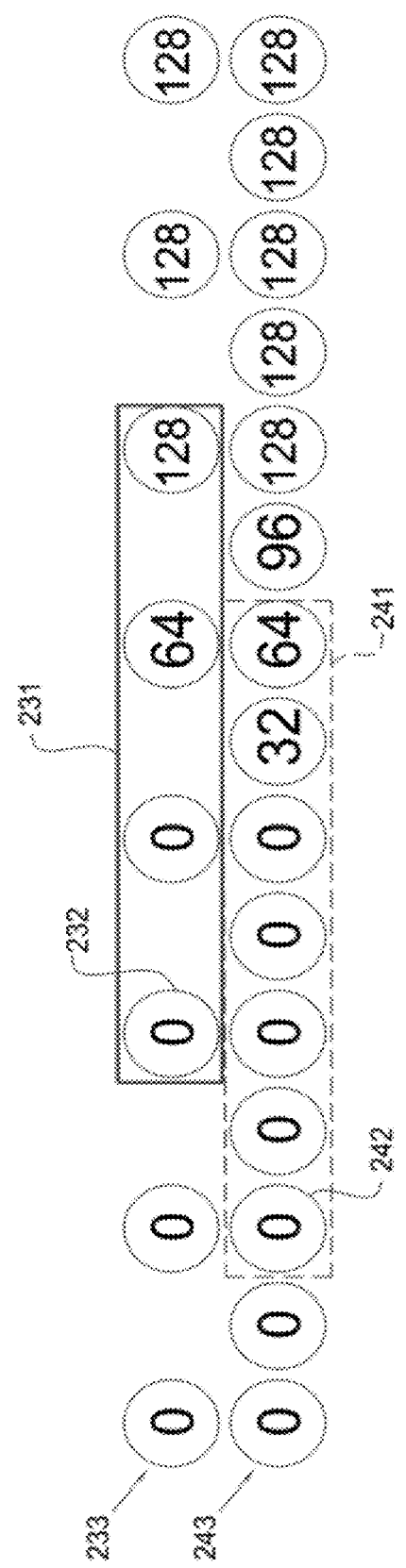

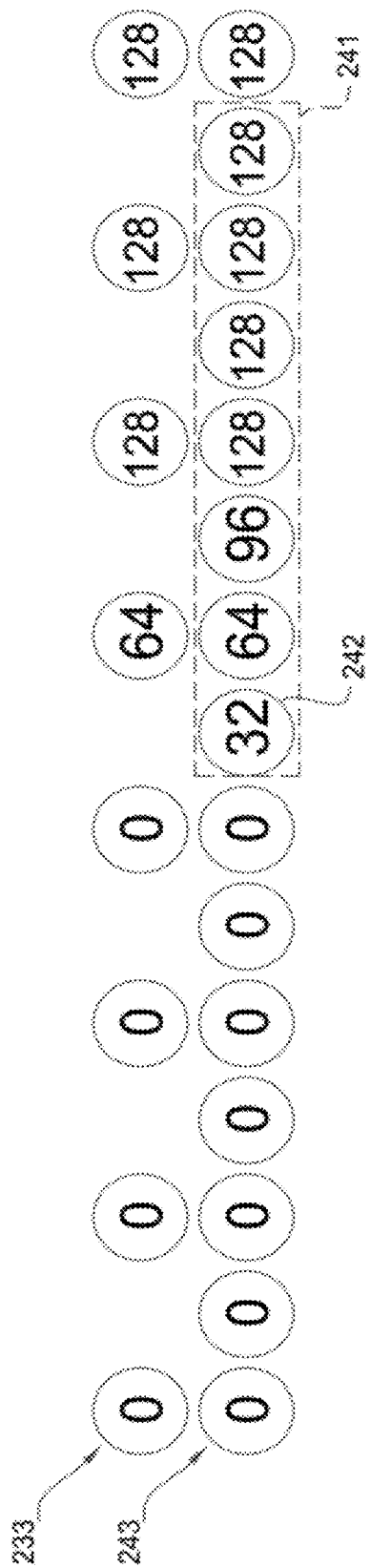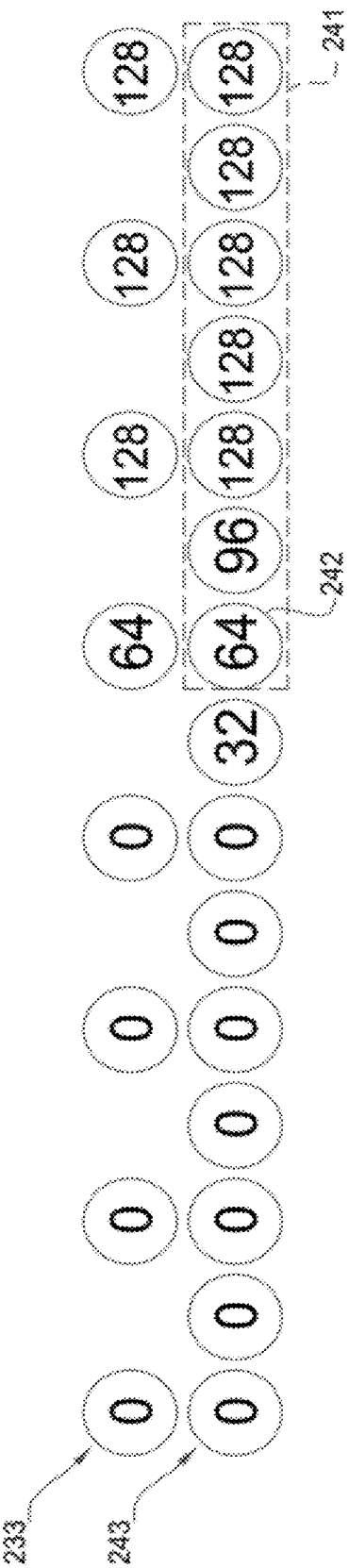

METHOD AND APPARATUS FOR DETECTING DISPLACEMENT WITH SUB-PIXEL ACCURACY

CROSS REFERENCE TO RELATED APPLICATION

This application is a continuation-in-part application of U.S. Ser. No. 12/020,699, filed on Jan. 28, 2008, the full disclosure of which is incorporated herein by reference.

BACKGROUND OF THE INVENTION

1. Field of the Invention

This invention generally relates to a method and an apparatus for detecting image displacement, and more particularly, to a method and an apparatus for detecting displacement with sub-pixel accuracy.

2. Description of the Related Art

A conventional method for detecting sub-pixel displacement, e.g. Taiwan patent number I225622 entitled "A method for detecting sub-pixel motion for optic navigation device", calculates the sub-pixel motion by the equations of approximately linear model of first order Taylor Expansion. The method includes the steps of: capturing a first and a second images at different time; choosing a plurality of pixels in the first image as reference pixels; calculating the partial derivatives of the reference pixels using the approximately linear model of first order Taylor Expansion from the two images and generating a plurality of first order equations; and calculating the sub-pixel motion according to the plurality of first order equations. However in practical operation, because the method for detecting displacement by using the equations of approximately linear model of first order Taylor Expansion leaves out higher order terms, errors may be introduced during detection and the method is only suitable for the cases with small displacements. When the displacements become larger, errors contained in the detected displacements become more apparent. In addition, because the partial derivatives have higher sensitivity to noise, the detected results can be easily affected by pixel noise.

Another conventional method for calculating relative displacement, e.g. U.S. Pat. No. 5,729,008 entitled "Method and device for tracking relative movement by correlating signals from an array of photoelements" as shown in FIG. 1, captures a first frame 91 of 7×7 pixels by an scanning device and defines a searching block 93 of 5×5 pixels in the central area of the first frame 91. The image device captures a second frame 92 in which the searching block 93 is shifted toward different directions so as to obtain images 940~948. A relative movement can be calculated according to a correlation between the searching block 93 in the images 940~948 and the second frame 92. However in practical operation, since the smallest movement which can be obtained by this conventional method is a distance between two adjacent pixels of the image device, it is unable to determine a tiny movement when the tiny movement is smaller than the distance of one pixel width.

According to the above reasons, it is necessary to further improve the aforementioned conventional method and apparatus for detecting pixel motion so as to solve the problems existed in the art.

SUMMARY OF THE INVENTION

It is an object of the present invention to provide a method and an apparatus for detecting displacement with sub-pixel accuracy which can increase the searching area and the resolution of the image by means of interpolation.

It is another object of the present invention to provide a method and an apparatus for detecting displacement with sub-pixel accuracy which can increase the searching efficiency by means of a two-stage searching process.

In order to achieve the above objects, the present disclosure provides a method of detecting displacement with sub-pixel accuracy for detecting a displacement of an optical navigation device with respect to a surface on which the optical navigation device is disposed, and the optical navigation device includes an image capturing unit, an interpolation unit and a processing unit. The method includes the steps of: moving the optical navigation device on the surface and capturing a first array image and a second array image with the image capturing unit; interpolating a first predetermined portion of the first array image to form a reference image with the interpolation unit; interpolating a second predetermined portion of the second array image to form a comparison image with the interpolation unit; and comparing the reference image with the comparison image by using the processing unit so as to obtain the displacement of the optical navigation device with respect to the surface thereby controlling a cursor or an aiming point accordingly.

According to another aspect of the present disclosure, there is further provided a method of detecting displacement with sub-pixel accuracy for detecting a displacement of an optical navigation device with respect to a surface on which the optical navigation device is disposed, and the optical navigation device includes an image capturing unit, an interpolation unit and a processing unit. The method includes the steps of: moving the optical navigation device on the surface and capturing a first array image and a second array image with the image capturing unit; performing a first searching and comparison in the second array image by using the processing unit; interpolating a first predetermined portion of the first array image to form a reference image with the interpolation unit; interpolating a second predetermined portion of the second array image to form a comparison image with the interpolation unit; performing a second searching and comparison in the comparison image by using the processing unit; and calculating the displacement of the optical navigation device with respect to the surface by using the processing unit thereby controlling a cursor or an aiming point accordingly.

According to an alternative aspect of the present disclosure, there is further provided a method of detecting displacement with sub-pixel accuracy for detecting a displacement of an optical navigation device with respect to a surface on which the optical navigation device is disposed, and the optical navigation device includes an image capturing unit, an interpolation unit and a processing unit. The method includes the steps of: moving the optical navigation device on the surface and capturing a first array image and a second array image with the image capturing unit; interpolating a first predetermined portion of the first array image to form a reference image with the interpolation unit; interpolating a second predetermined portion of the second array image to form a comparison image with the interpolation unit; performing a first searching and comparison in the comparison image by using the processing unit; performing a second searching and comparison in the comparison image by using the processing unit; and calculating the displacement of the optical navigation device with respect to the surface by using the processing unit thereby controlling a cursor or an aiming point accordingly.

The present disclosure further provides an optical navigation device for detecting displacement with sub-pixel accuracy including an imaging capturing unit, an interpolation unit, a storage unit and a processing unit. The imaging capturing unit is for capturing a first array image and a second array image of a surface on which the optical navigation device is moving. The interpolation unit is for interpolating a predetermined portion of the first array image and the second array image to respectively form a reference image and a comparison image. The storage unit is for storing the first array image, the second array image, the reference image and the comparison image. The processing unit is for comparing the first array image with the second array image, and/or comparing the reference image with the comparison image so as to obtain a displacement of the optical navigation device with respect to the surface thereby controlling a cursor or an aiming point accordingly, wherein the processing unit is configured to define a first reference searching block in the first array image and define a first searching block in the second array image, and then successively search all pixels in the second array image with the first searching block and compare the first reference searching block with the first searching block so as to obtain a smallest sum of absolute values of all the differences in gray level value between every pixels in the first searching block and the pixels at corresponding positions in the first reference searching block to obtain the displacement, and/or is configured to define a second reference searching block in the reference image and define a second searching block in the comparison image, and then successively search all pixels in the comparison image with the second searching block and compare the second reference searching block with the second searching block so as to obtain a smallest sum of absolute values of all the differences in gray level value between every pixels in the second searching block and the pixels at corresponding positions in the second reference searching block to obtain the displacement.

The method and apparatus for detecting displacement with sub-pixel accuracy of the present invention can increase the searching region by means of interpolation and detect a tiny displacement having sub-pixel level accuracy. The detected results can be transmitted to an image display, e.g. a TV screen, a computer screen, a game machine screen and a projection screen, through a transmitting interface so as to correspondingly control a cursor or the aiming point of a pointer. Embodiments of the apparatus for detecting displacement with sub-pixel accuracy include an optical mouse and a navigation device.

BRIEF DESCRIPTION OF THE DRAWINGS

Other objects, advantages, and novel features of the present invention will become more apparent from the following detailed description when taken in conjunction with the accompanying drawings.

FIG. 7a shows a schematic view of the gray level distribution of the first array image captured by the image capturing unit according to the embodiment of the present invention.

FIG. 7b shows a schematic view of the gray level distribution of the second array image captured by the image capturing unit according to the embodiment of the present invention.

FIG. 8c shows another schematic view of the gray level distribution of one row of the second array image captured by the image capturing unit and that of the comparison image according to the embodiment of the present invention, wherein the first searching block moves rightward by 2 columns of intensity interval and the second searching block moves rightward by 1 column of intensity interval.

FIG. 8d shows another schematic view of the gray level distribution of one row of the second array image captured by the image capturing unit and that of the comparison image according to the embodiment of the present invention, wherein the first searching block further moves rightward by 2 columns of intensity interval and the second searching block further moves rightward by 1 column of intensity interval.

FIG. 8i shows another schematic view of the gray level distribution of one row of the second array image captured by the image capturing unit and that of the comparison image according to the embodiment of the present invention, wherein the first searching block finished the searching of the second array image and the second searching block further moves rightward by 1 column of intensity interval.

FIG. 8j shows another schematic view of the gray level distribution of one row of the second array image captured by the image capturing unit and that of the comparison image according to the embodiment of the present invention, wherein the first searching block finished the searching of the second array image and the second searching block has finished the searching of the comparison image.

DETAILED DESCRIPTION OF THE PREFERRED EMBODIMENT

Figure 1:
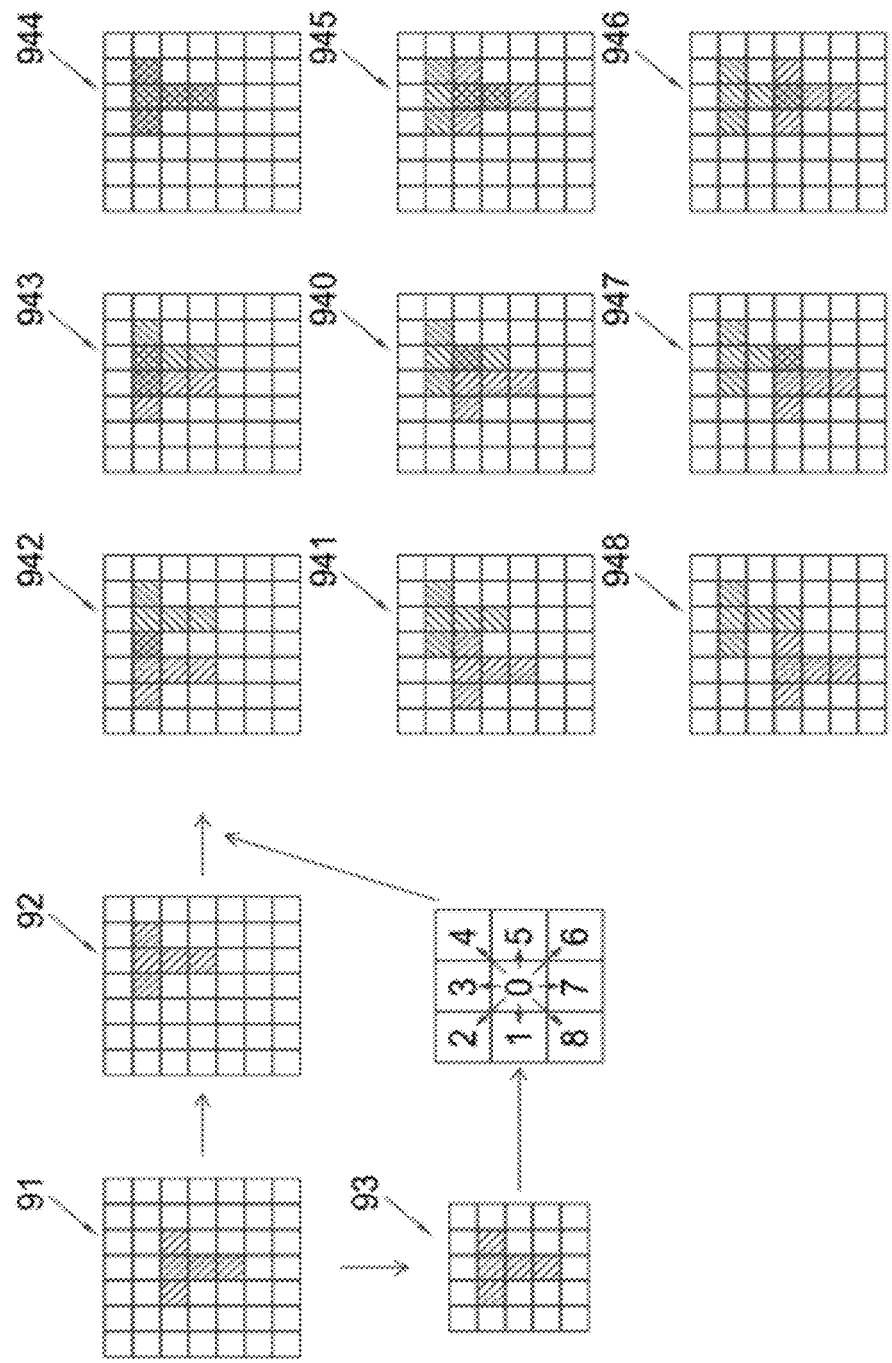
FIG. 1 shows a schematic view of a conventional method for calculating relative movements.
Figure 2:
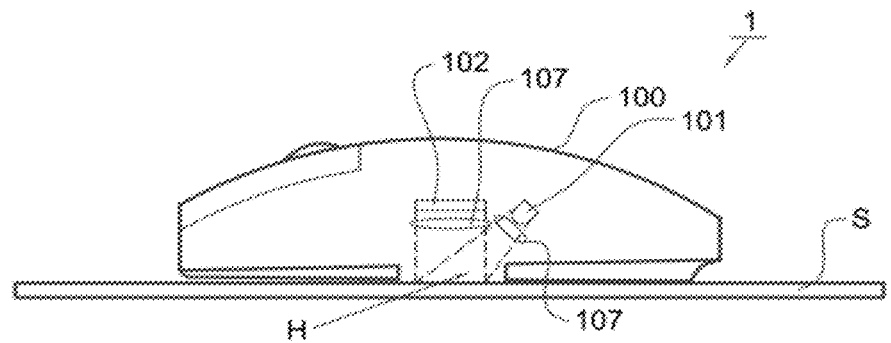
FIG. 2 shows a schematic view of an apparatus for detecting displacement with sub-pixel accuracy according to one embodiment of the present invention.
Figure 3:
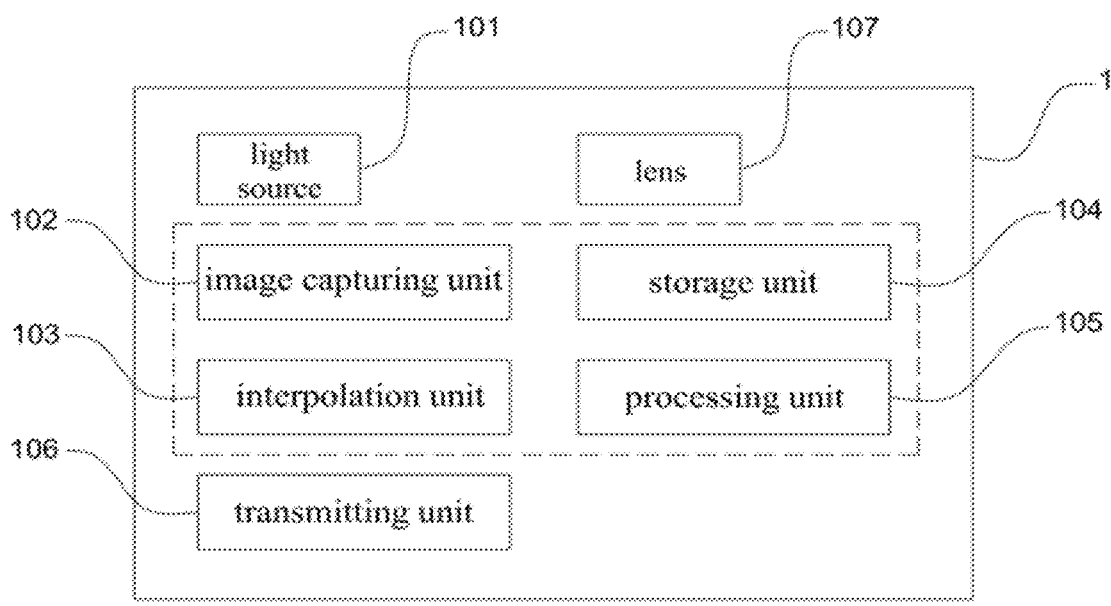
FIG. 3 shows a block diagram of an apparatus for detecting displacement with sub-pixel accuracy according to one embodiment of the present invention.

It should be noticed that, wherever possible, the same reference numbers will be used throughout the drawings to refer to the same or like parts Referring to FIGS. 2 and 3, they respectively illustrate a schematic view and a block diagram of an apparatus for detecting displacement with sub-pixel accuracy 1 according to the embodiment of the present invention. Embodiments of the apparatus 1 include, but not limited to, an optical mouse and a navigation device. In the illustration of the present invention, an optical mouse shown in FIG. 2 is served as an exemplary embodiment of the apparatus for detecting displacement with sub-pixel accuracy 1. The apparatus 1 has a shell 100 having an opening "H" disposed at the bottom surface thereof and is placed on a surface "S", e.g. the surface of a table or a mouse pad, during operation. A light source 101, an image capturing unit 102, an interpolation unit 103, a storage unit 104, a processing unit 105, a transmitting unit 106 and at least one lens 107 are disposed inside the shell 100. Embodiments of the light source 101 include, but not limited to, a light emitting diode (LED) and a laser diode, e.g. an infrared LED or an infrared laser diode. The light source 101 lights the surface "S" through the opening "H" of the shell 100 and the light reflected from the surface "S" enters the shell 100 again through the opening "H". Embodiments of the image capturing unit 102 include a Charge-Coupled Device (CCD) image sensor, a Complementary Metal-Oxide-Semiconductor (CMOS) image sensor and the like. The image capturing unit 102 continuously captures optical images of the surface "S" through the opening "H" and converts the optical images into a plurality of array images.

In one embodiment, the array images are stored in the storage unit 104 at first and then the stored array images are interpolated, e.g. bilinear interpolation, by the interpolation unit 103 so as to form at least one reference image and a plurality of comparison images which will then be stored back into the storage unit 104. In another embodiment, the array images are directly interpolated by the interpolation unit 103 to form at least one reference image and a plurality of comparison images which then will be stored in the storage unit 104. The processing unit 105 defines a reference searching block in the reference image, which is stored in the storage unit 104, and defines a searching block in the comparison images, which are also stored in the storage unit 104, and then controls the searching block to search the whole comparison image and to simultaneously compare the searching block with the reference searching block during searching process so as to calculate a displacement of the shell 100 with respect to the surface "S". The detailed descriptions of the searching and interpolation processes will be illustrated in the following paragraphs. The calculated displacement is then transmitted to an image display (not shown), e.g. a computer screen, a TV screen, a game machine screen or a projection screen, through the transmitting unit 106 so as to perform a corresponding control on the image display, such as a motion control of a cursor on a computer screen or a motion control of the aiming pointer of a pointing device. In addition, a lens 107 may be disposed in front of the light source 101 so as to adjust the lighting area of the light source 101, and a lens 107 may be disposed in front of the image capturing unit 102 so as to improve the detecting efficiency of the image capturing unit 102.

Figure 4:
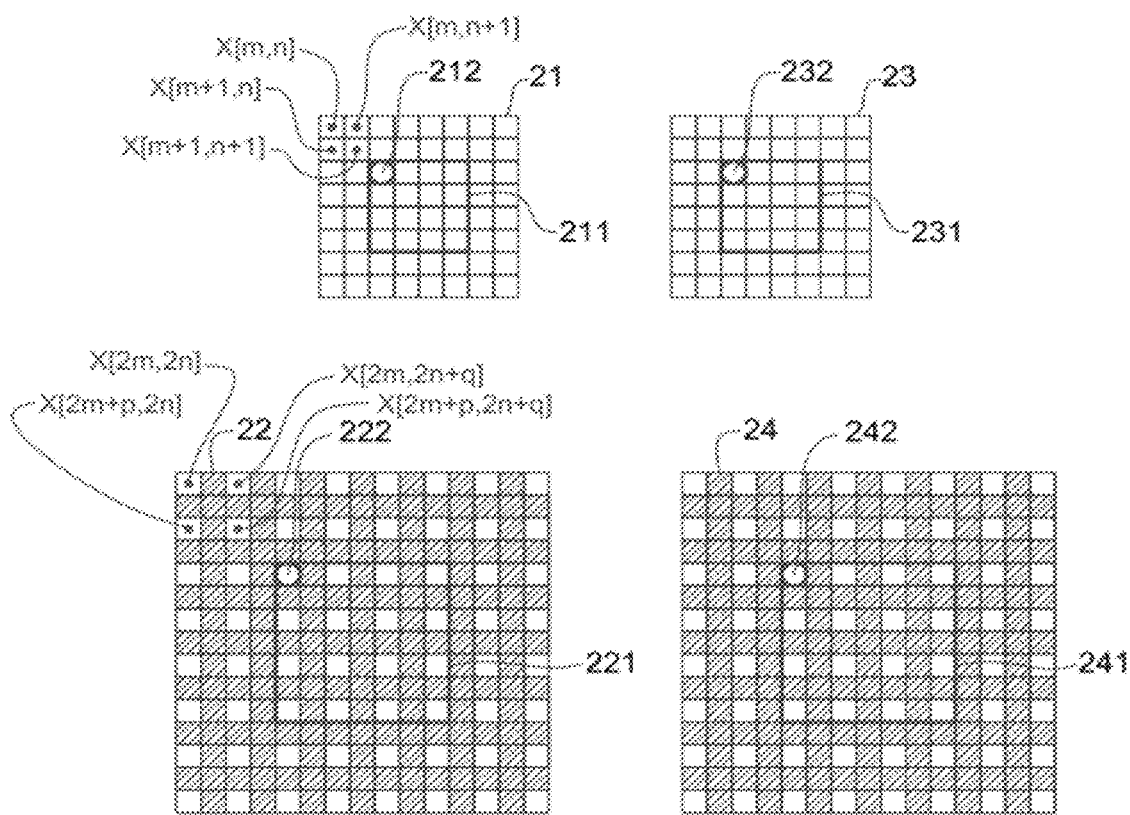
FIG. 4 shows a schematic view of the interpolation used in the method for detecting displacement with sub-pixel accuracy according to the embodiment of the present invention.

Referring to FIGS. 2, 3 and 4, the interpolation process will be illustrated hereinafter. The image capturing unit 102 captures light from the surface "S" at a first time to form a first array image 21 which is an array image of 8×8 pixels in this embodiment. Before interpolation, the pixel at the top-left corner of the first array image 21 has a gray level value of $x[m,n]$; its lower adjacent pixel has a gray level value of $x[m+1,n]$; its right adjacent pixel has a gray level value of $x[m,n+1]$; its diagonal adjacent pixel has a gray level value of $x[m+1,n+1]$ and every pixels of the first array image 21 have corresponding gray level values. The central area of the first array image 21 having 4×4 pixels is defined as a first reference searching block 211 and the pixel at the top-left corner of the first reference searching block 211 is defined as a first reference point 212 having an initial coordinate of $[x_{start\_1}, y_{start\_1}]$. The first array image 21 is then interpolated by the interpolation unit 103, for example, according to equation (1):

$$x[2m+p,2n+q]=(1-t)\times(1-u)\times x[2m,2n]+t\times(1-u)\times x[2m+2,2n]+(1-t)\times u\times x[2m,2n+2]+t\times u\times x[2m+2,2n+2], \quad (1)$$

where $(t,u)=(p/2,q/2)$; $0\leq p\leq 2$ and $0\leq q\leq 2$.

A reference image 22 can be obtained after the interpolation process, wherein the pixel at the top-left corner of the reference image 22 has a gray level value of $x[2m,2n]$; the second pixel below the pixel $[2m,2n]$ has a gray level value of $x[2m+p,2n]$; the right second pixel of the pixel $[2m,2n]$ has a gray level value of $x[2m,2n+q]$; and the diagonal second pixel of the pixel $[2m,2n]$ has a gray level value of $x[2m+p,2n+q]$. In this embodiment, the reference image 22 contains a plurality of non-interpolated pixels having gray pixel values identical to the pixels in the first array image 21 (shown as the blank pixels in FIG. 4, e.g. $x[m,n]$ having a gray pixel value identical to $x[2m,2n]$), and a plurality of interpolated pixels which are referred to sub-pixels in the present invention (e.g. the pixels filled with oblique lines shown in FIG. 4). The first reference searching block 211 is converted to the second reference searching block 221 of 7×7 pixels after interpolation and the pixel at the top-left corner of the second reference searching block 221 is defined as a second reference point 222 with an initial coordinate $[x_{start\_2}, y_{start\_2}]$. It should be noted that, it is only an exemplary embodiment of the present invention to interpolate one sub-pixel between two adjacent pixels. In other embodiments, any number of sub-pixels, rather than one sub-pixel, can be interpolated into two adjacent pixels without departing from the spirit of the present invention.

The image capturing unit 102 captures light reflected from the surface "S" at a second time to form a second array image 23 which will then be interpolated by the interpolation unit 103 to form a comparison image 24. Since the interpolation process is identical to the process forming the reference image 22, the detailed descriptions will not be illustrated herein. Similarly, the comparison image 24 contains a plurality of non-interpolated pixels having gray pixel values identical to the pixels in the second array image 23 (e.g. the blank pixels shown in FIG. 4) and a plurality of interpolated pixels which are referred to sub-pixels in the present invention (e.g. the pixels filled with oblique lines shown in FIG. 4). Then, the processing unit 105 defines a first searching block 231 in the second array image 23 which has the same pixel area as the first reference searching block 211, and defines a third reference point 232 inside the first searching block 231 with a position corresponding to that of the first reference point 212 in the first reference searching block 211. The processing unit 105 defines a second searching block 241 in the comparison image 24 which has the same pixel area as the second reference searching block 221, and defines a fourth reference point 242 inside the second searching block 241 with a position corresponding to that of the second reference point 222 in the second reference searching block 221. In should be noted that, the position of the first reference point 212 inside the first reference searching block 211, the position of the second reference point 222 inside the second reference searching block 221, the position of the third reference point 232 inside the first searching block 231 and the position of the fourth reference point 242 inside the second searching block 241 are not limited to this embodiment, and each reference point can be defined at any position inside the corresponding block.

In the description herein, for comparison purpose, the displacement detection based on images without interpolation of conventional method and the displacement detection method based on images with interpolation of the present invention are respectively illustrated. In conventional method, i.e. the displacement detection method based on images without interpolation, the first searching block 231 successively searches all pixels of the second array image 23 and simultaneously compares with the first reference searching block 211, as shown in FIG. 4. According to the initial coordinate $[x_{start\_1}, y_{start\_1}]$ of the first reference point 212, the searching area of the first searching block 231 in the second array image 23 is $[x_{start\_1}-2, x_{start\_1}+2, y_{start\_1}+2]$, i.e. the searching times of the first searching block 231 in the second array image 23 and the comparison times of the first searching block 231 with the first reference searching block are 25 times. The comparison is to calculate a sum of the absolute values of the differences in gray level value between every pixels in the first reference searching block 211 and the pixels at corresponding positions in the first searching block 231. Totally, 25 sums can be obtained and the smallest one of the 25 sums of the absolute values of all the differences is defined as the best matching (optimal), and the displacement will be calculated according to the optimal case. The detailed descriptions will be illustrated in the following paragraphs.

However in the present invention, i.e. the displacement detection based on images with interpolation, the second searching block 241 successively searches all pixels of the comparison image 24 and simultaneously compares with the second reference searching block 221, as shown in FIG. 4. According to the initial coordinate $[x_{start\_2}, y_{start\_2}]$ of the second reference point 222, the searching area of the second searching block 241 in the comparison image 24 is $[x_{start\_2}-4, x_{start\_2}+4, y_{start\_2}-4, y_{start\_2}+4]$, i.e. the searching times of the second searching block 241 in the comparison image 24 and the comparison times of the second searching block 241 with the second reference searching block are 81 times. The comparison is to calculate a sum of the absolute values of the differences in gray level value between every pixels in the second reference searching block 221 and the pixels at corresponding positions in the second searching block 241. Totally, 81 sums can be obtained and the smallest one of the 81 sums of the absolute values of all the differences is defined as the best matching (optimal), and the displacement will be calculated according to the optimal case. In this manner, the searching area can be increased after interpolation so as to improve the image resolution.

Figure 5:
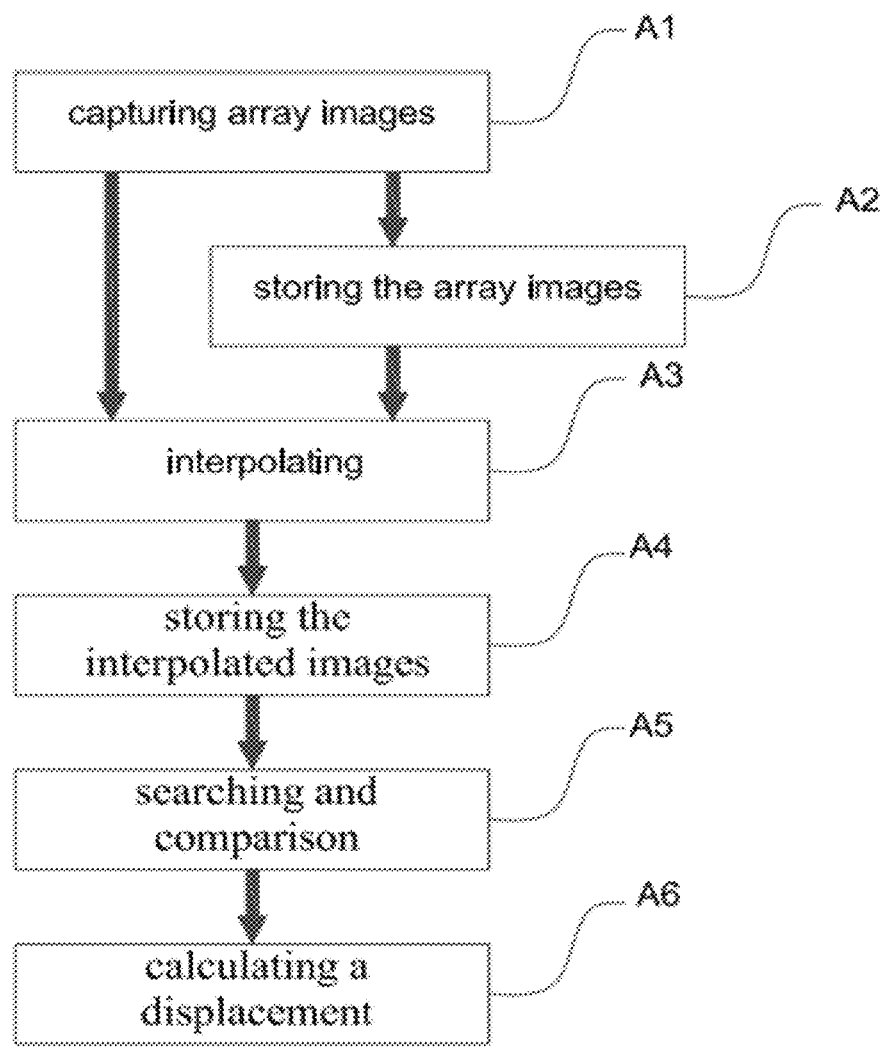
FIG. 5 shows a flow chart of the method for detecting displacement with sub-pixel accuracy according to the embodiment of the present invention.

Referring to FIG. 5, it shows a flow chart of the method for detecting displacement with sub-pixel accuracy according to one embodiment of the present invention. The method includes the steps of: capturing a plurality of array images (step A1); storing the array images (step 2); interpolating (step A3); storing the interpolated images (step A4); searching and comparison (step A5); and calculating a displacement (step A6).

Figure 6:
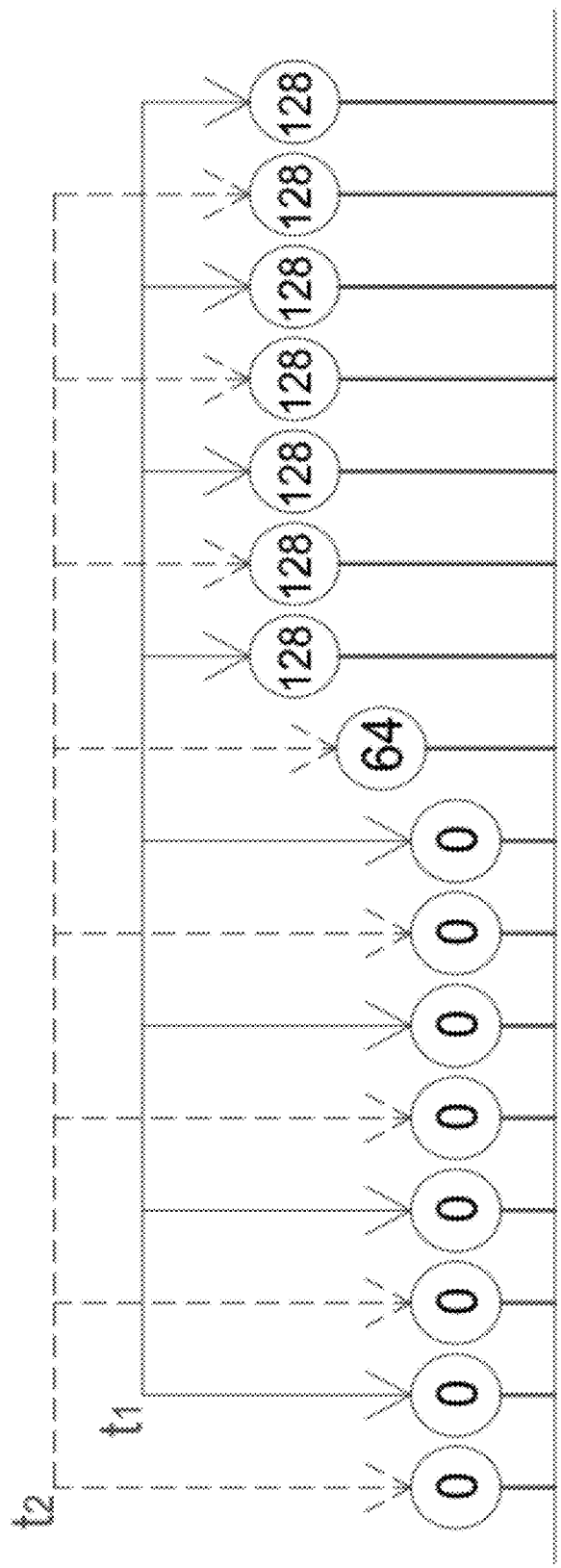
FIG. 6 shows a schematic view of the intensity distribution on a surface used in the embodiment of the present invention.

Referring to FIGS. 5, 6 and 7a and 7b, the method for detecting displacement with sub-pixel accuracy will be illustrated hereinafter. In this embodiment, the surface "S" is illuminated by the light source 101 and a brightness variation with 16 columns is formed thereon as shown in FIG. 6, wherein pixels at each column have identical brightness and an interval between two adjacent columns is identical to one-half of the distance between two adjacent pixels of the sensing array (not shown) of the image capturing unit 102. Although the sensing array shown in this embodiment has 8×8 pixels, the total pixel number in actual product is determined by the resolution of the sensing array. At first time $t_1$, the capturing unit 102 captures the brightness of even columns on the surface "S" so as to form a first array image 21, as shown in FIG. 7a, wherein each circle represents a pixel of the sensing array and the number inside each circle denotes the brightness (gray level value) of that pixel. At second time $t_2$, the apparatus 1 moves leftward, according to FIG. 6, by one column distance (one-half of the distance between two adjacent pixels of the sensing array of the image capturing unit 102), and the image capturing unit 102 captures the brightness of odd columns on the surface "S" so as to form a second array image 23, as shown in FIG. 7b (step A1). The first array image 21 and the second array image 23 can be stored into the storage unit 104 first (step A2), or they can be directly interpolated by the interpolation unit 103 (step A3) and then be stored in the storage unit 104 (step A4).

Figure 8A:
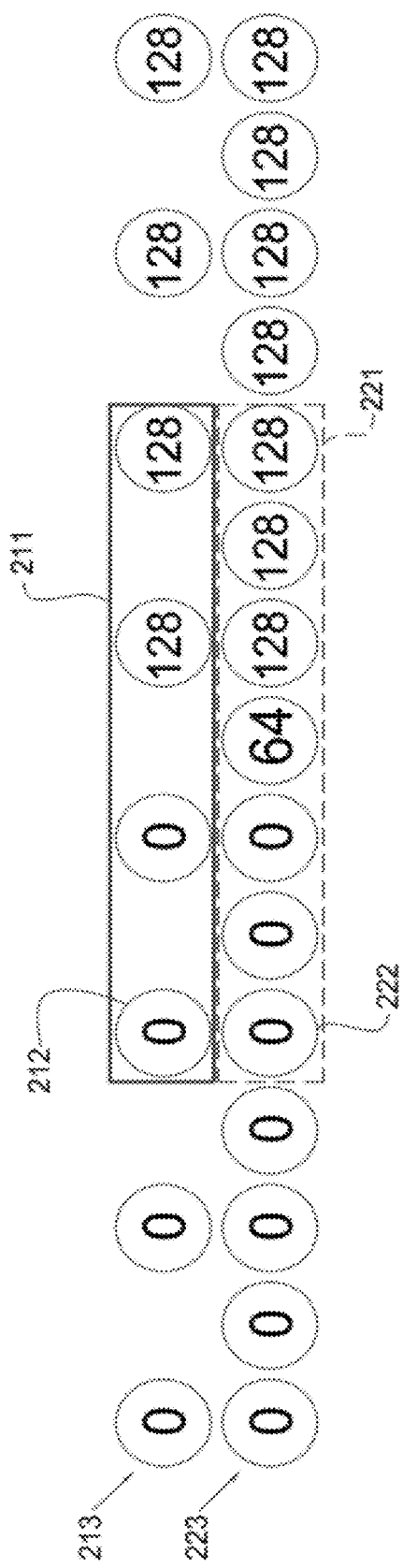
FIG. 8a shows a schematic view of the gray level distribution of one row of the first array image captured by the image capturing unit and that of the reference image according to the embodiment of the present invention, wherein the upper row shows one row of the first array image and the first reference searching block while the lower row shows one row of the reference image and the second reference searching block.

Referring FIGS. 7a, 7b and 8a to 8j, since all pixels in each column of the array image detected by the image capturing unit 102 have identical brightness, for simplification purpose, only one row, e.g. first row, of the first array image 21 and the second array image 23 is taken as an example for illustration. In FIG. 8a, upper row denotes the first row 213 of the first array image 21, wherein the rectangle with solid line represents the first reference searching block 211 of 1×4 pixels and the left first pixel is defined as the first reference point 212; lower row denotes the interpolated first row 223 of the reference image 22 (not shown), wherein the rectangle with dotted line represents the second reference searching block 221 of 1×7 pixels and the left first pixel is defined as the second reference point 222. In each figure of FIGS. 8b to 8j, upper row denotes the first row 233 of the second array image 23, wherein the rectangle with solid line represents the first searching block 231 of 1×4 pixels and the left first pixel is defined as the third reference point 232, and the first searching block 231 successively searches all pixels of the first row 233 of the second array image 23 (by two columns of brightness each step); lower row denotes the first row 243 of the interpolated comparison image 24 (not shown), wherein the rectangle with dotted line represents the second searching block 241 of 1×7 pixels and the left first pixel is defined as the fourth reference point 242, and the second searching block 241 successively searches all pixels of the first row 243 of the comparison image 24 (by one column of brightness each step).

Figure 8B:
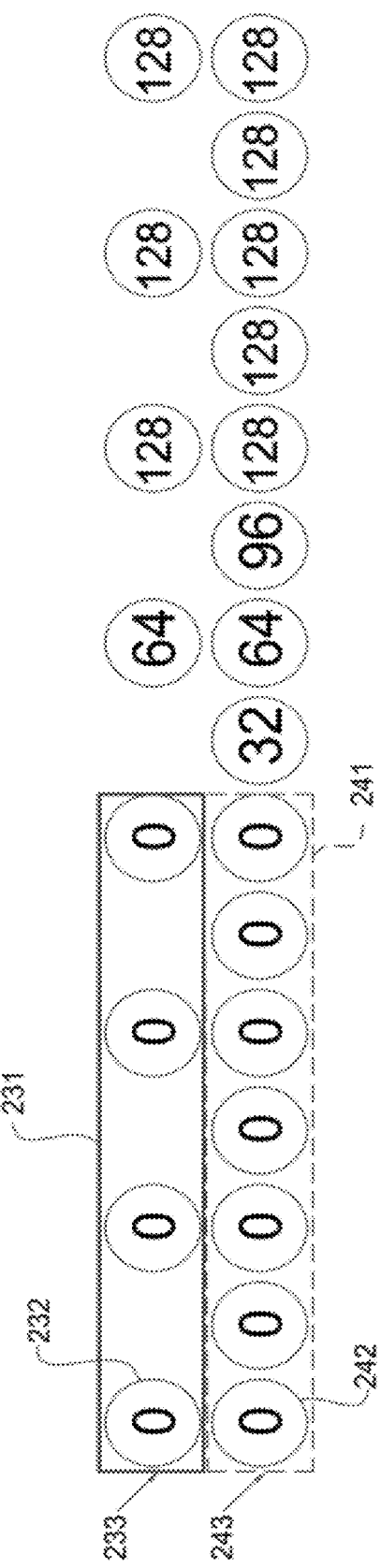
FIG. 8b shows a schematic view of the gray level distribution of one row of the second array image captured by the image capturing unit and that of the comparison image according to the embodiment of the present invention, wherein the upper row shows one row of the second array image and the first searching block while the lower row shows one row of the comparison image and the second searching block.
Figure 8E:
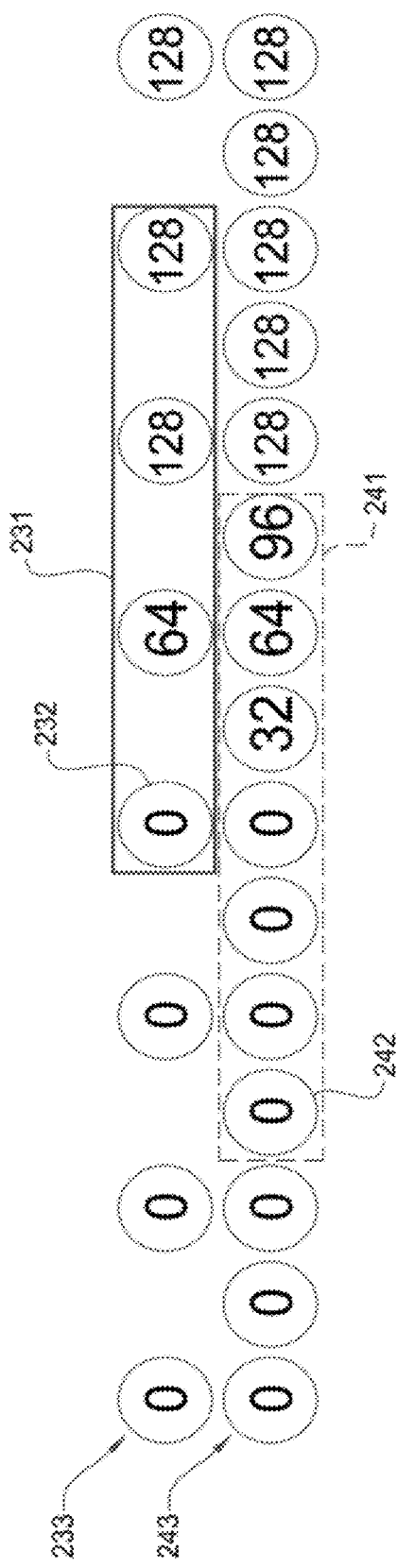
FIG. 8e shows another schematic view of the gray level distribution of one row of the second array image captured by the image capturing unit and that of the comparison image according to the embodiment of the present invention, wherein the first searching block further moves rightward by 2 columns of intensity interval and the second searching block further moves rightward by 1 column of intensity interval.
Figure 8F:
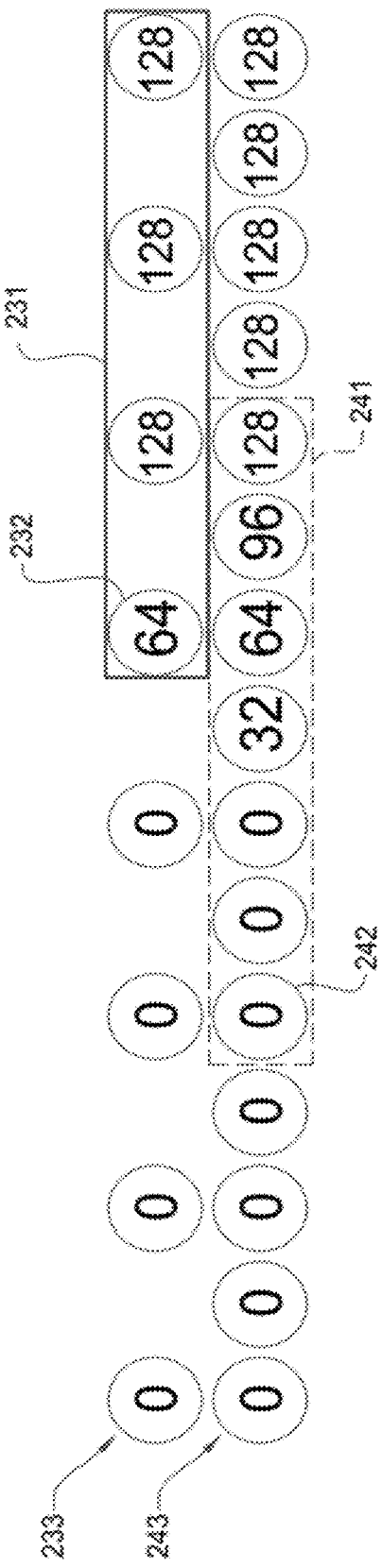
FIG. 8f shows another schematic view of the gray level distribution of one row of the second array image captured by the image capturing unit and that of the comparison image according to the embodiment of the present invention, wherein the first searching block has finished the searching of the second array image and the second searching block further moves rightward by 1 column of intensity interval.

In conventional method, i.e. without interpolation, the first searching block 231 successively searches the second array image 23 and simultaneously compares with the first reference searching block 211. During comparison, differences in gray level value between every pixels [0,0,0,0] in the first searching block 231 and every pixels [0,0,128,128] in the first reference searching block 211 are calculated, as shown in FIG. 8b, and a sum of the absolute values of all the differences is calculated to be 256. Then, successively calculate the sums of the absolute values of all the differences in gray level value between every pixels in the first searching block 231 of FIGS. 8c to 8f and every pixels [0,0,128,128] in the first reference searching block 211, and several sums 192, 64, 64 and 192 can be obtained. The best matching defined by the present invention is the first searching block 231 having the smallest sum of the absolute values of all the differences; therefore, 2 best matching can be obtained which have a sum of 64 as shown in FIGS. 8d and 8e in the conventional method without interpolation. The displacement is defined as a vector from the first reference point 212 to the third reference point 232 shown in FIG. 8d, i.e. the apparatus 1 has no displacement; meanwhile, the displacement is also defined as the vector from the first reference point 212 to the third reference point 232 shown in FIG. 8e (moving rightward by one column of brightness), i.e. the apparatus 1 moving leftward by one column of brightness. Accordingly, in conventional method, since the interpolation is not performed, the apparatus 1 may not be able to correctly estimate the moving direction and the displacement.

Figure 8G:
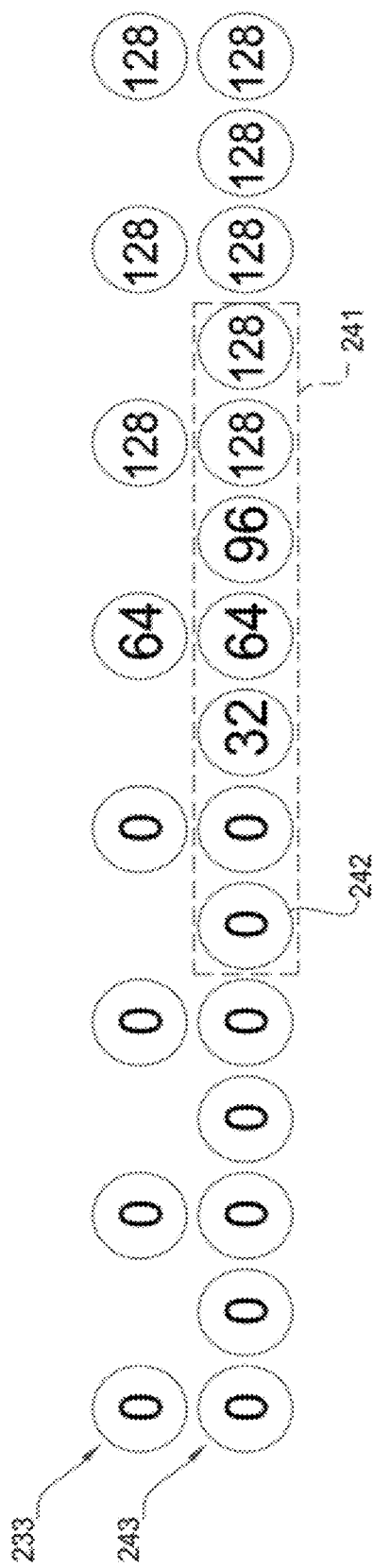
FIG. 8g shows another schematic view of the gray level distribution of one row of the second array image captured by the image capturing unit and that of the comparison image according to the embodiment of the present invention, wherein the first searching block finished the searching of the second array image and the second searching block further moves rightward by 1 column of intensity interval.
Figure 8H:
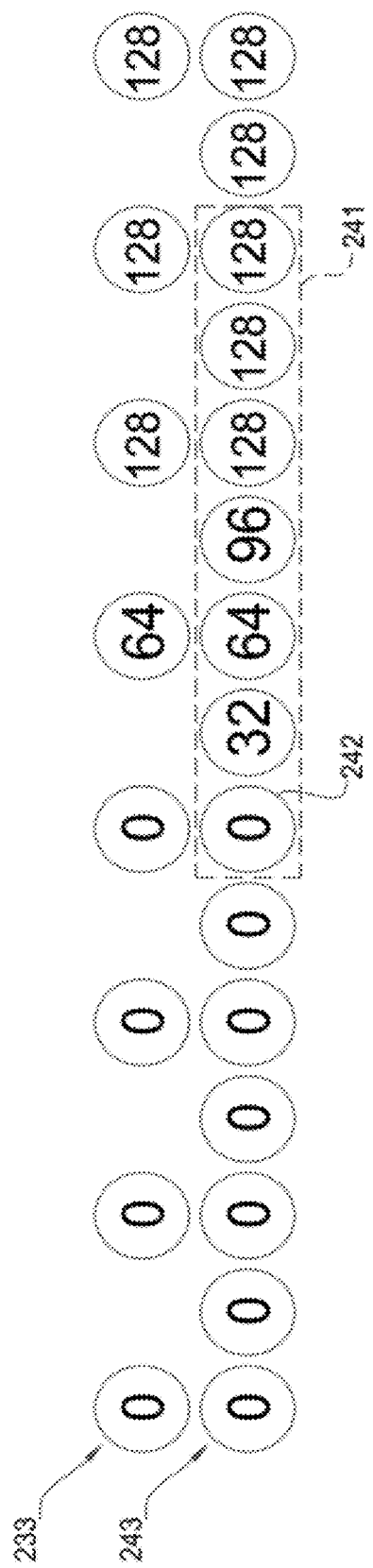
FIG. 8h shows another schematic view of the gray level distribution of one row of the second array image captured by the image capturing unit and that of the comparison image according to the embodiment of the present invention, wherein the first searching block finished the searching of the second array image and the second searching block further moves rightward by 1 column of intensity interval.

In the present invention, i.e. with interpolation, the second searching block 241 successively searches the comparison image 24 and simultaneously compares with the second reference searching block 221. During comparison, differences in gray level value between every pixels [0,0,0,0,0,0,0] in the second searching block 241 and every pixels [0,0,0,64,128, 128,128] in the second reference searching block 221 are calculated, as shown in FIG. 8b, and a sum of the absolute values of all the differences is obtained to be 448. Then, successively calculate the sums of the absolute values of all the differences in gray level value between every pixels in the second searching block 241 of FIGS. 8c to 8j and every pixels [0,0,0,64,128,128,12] in the second reference searching block 221, and several sums 416, 352, 256, 128, 64, 128, 256 and 352 can be obtained. The best matching defined by the present invention is the second searching block 241 having the smallest sum of the absolute values of all the differences. In this embodiment, since the interpolation is processed firstly and then the displacement is estimated, only one best matching (optimal) can be obtained which has a sum of 64 (FIG. 8g). The displacement is defined as the vector from the second reference point 222 to the fourth reference point 242 shown in FIG. 8g (moving rightward by one column of brightness), i.e. the apparatus 1 moving leftward by one column of brightness. Accordingly, by processing interpolation, the present invention can accurately estimate the moving direction and displacement of the apparatus 1 to sub-pixel accuracy level.

Figure 9:
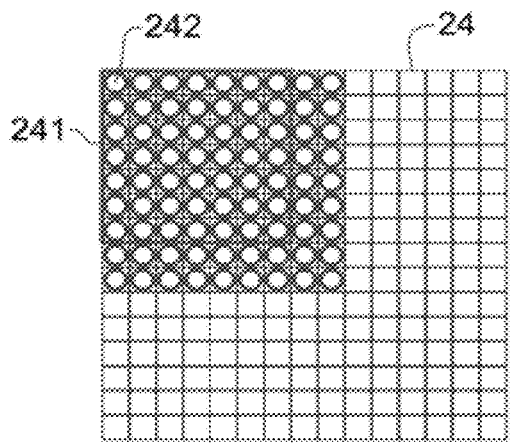
FIG. 9 shows a schematic view of the comparison image and the searching points of the fourth reference point in the second searching block, wherein the second searching block has to search 81 times.
Figure 10:
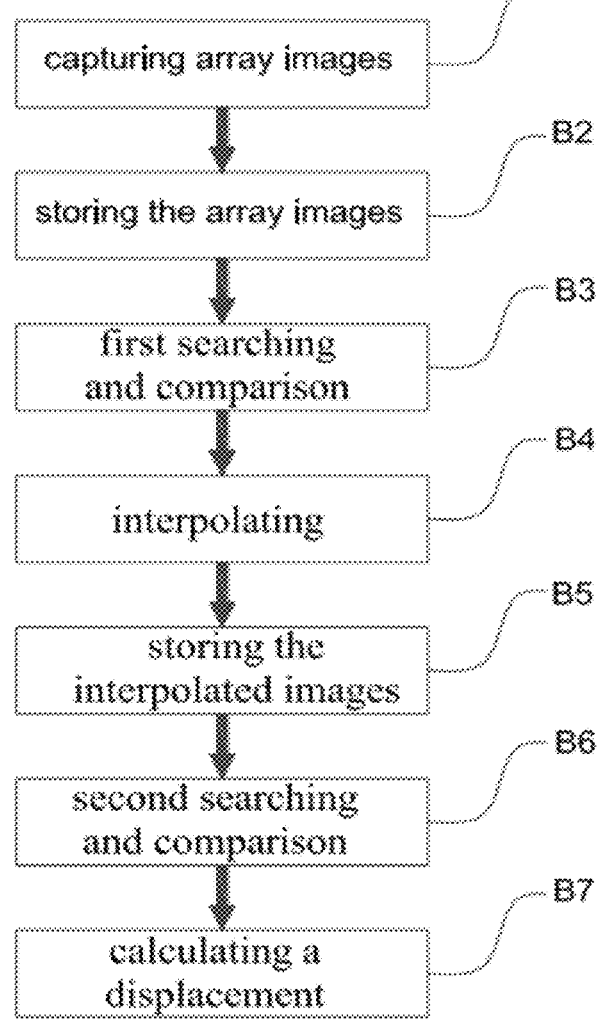
FIG. 10 shows a flow chart of the method for fast detecting displacement with sub-pixel accuracy according to the embodiment of the present invention.
Figure 10A:
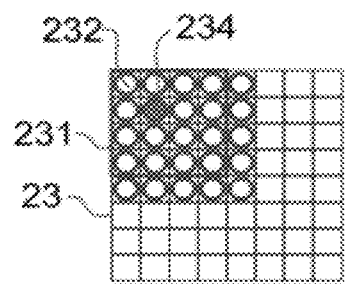
FIG. 10a shows a schematic view of the first searching points of the method for fast detecting displacement with sub-pixel accuracy according to the embodiment of the present invention, wherein the first searching needs 25 times.
Figure 10B:
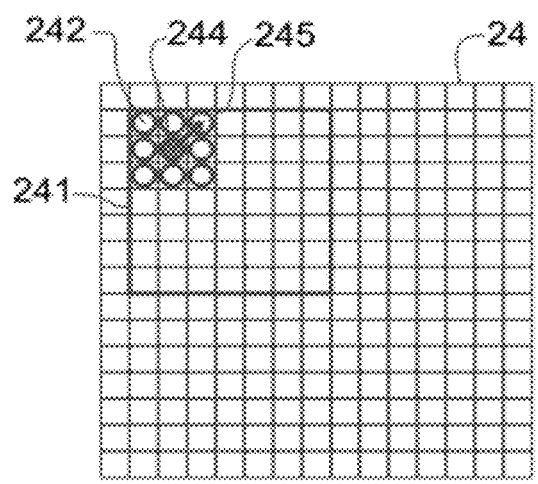
FIG. 10b shows a schematic view of the second searching points of the method for fast detecting displacement with sub-pixel accuracy according to the embodiment of the present invention, wherein the second searching needs 9 times.

Referring to FIGS. 4, 9, 10 and 10a to 10b, as described above, after interpolation, the second searching block 241 needs to search 81 times for a 15×15 pixels area, as shown in FIG. 9, wherein each fourth reference point 242 has a corresponding second searching block 241. It can be easily seen from FIG. 9 that the fourth reference point 242 needs to search 81 positions. In order to reduce searching and comparison times, the present invention further provides a method for fast detecting displacement with sub-pixel accuracy as shown in FIGS. 10, 10a and 10b. The method includes the steps of: capturing a plurality of array images (step B1); storing the array images (step B2); performing the first searching and comparison (step B3); interpolating (step B4); storing the interpolated images (step B5); performing the second searching and comparison (step B6); and finally calculating a displacement (step B7). The differences between FIG. 10 and FIG. 5 is that, the first searching block 231 successively searches the second array image 23 before the captured array images (step B1) are interpolated so as to obtain a first optimal searching block which has a corresponding third reference point 232 (step B3), e.g. pixel 234 shown in FIG. 10a. This step needs to search and compare for 25 times. Then the second array image 23 is interpolated (step B4) and the pixel 234 is converted to the pixel 244 after interpolation. It can be understood that, in this embodiment, the pixel 244 is a non-interpolated pixel and thus pixels 234 and 244 have identical gray level values or brightness values. Then the fourth reference point 242 successively searches the pixel 244 and its adjacent 8 pixels in the comparison image 24, and the second searching block 241 corresponded to the fourth reference point 242 is compared with the second reference searching block 221 so as to obtain a second optimal searching block which has a corresponding fourth reference point 242, e.g. pixel 245 shown in FIG. 10b. The pixel 245 is served as the last optimal reference point (step B6), and this step needs to search and compare for 9 times. Accordingly, in this embodiment, it is necessary to search and compare only for totally 25+9=34 times. Finally, calculate a distance between the last optimal searching point (pixel 245) and the second reference point 222 to be served as the displacement (step B7). In this manner, searching and comparison times can be significantly decreased so as to increase the calculating speed of the displacement. In addition, other procedures are similar to that of the method for detecting displacement with sub-pixel accuracy shown in FIG. 5 and they will not be described herein in detail.

Referring to FIGS. 4, 9, 11, 11a and 11b, they show another method for fast detecting displacement with sub-pixel accuracy of the present invention. The method includes the steps of: capturing a plurality of array images (step C1); interpolating (step C2), storing the interpolated images (step C3); performing the first searching and comparison (step C4); performing the second searching and comparison (step C5); and finally calculating a displacement (step C6). After the image capturing unit 102 captures the first array image 21 and the second array image 23 (step C1), they are directly interpolated by the interpolation unit 103 so as to form the reference image 22 and the comparison image 24 (step C2) which are then stored into the storage unit 104 (unit C3). The processing unit 105 defines the second reference searching block 221 and the second reference point 222 in the reference image 22, and defines the second searching block 241 and the fourth reference point 242 in the comparison image 24 (FIG. 4). Then the processing unit 105 controls the second searching block 241 to successively search the comparison image 24 and compare with the second reference searching block 221. In this embodiment, the processing unit 105 controls the fourth reference point 242 to search only predetermined positions in the comparison image 24, e.g. the positions of circles shown in FIG. 11a (the fourth reference point 242), and this step needs to search 25 positions, wherein each fourth reference point 242 has a corresponding second searching block 241. Accordingly, it is able to obtain a third optimal searching block which has a corresponding fourth reference point 242, e.g. pixel 246 shown in FIG. 11a, and this step needs to search and compare for 25 times (step C4). This is the main difference with respect to the method for detecting displacement with sub-pixel accuracy shown in FIG. 5, i.e. the fourth reference point 242 searches only the predetermined pixels. Next, the processing unit 105 controls the fourth reference point 242 to search only the pixels 246 and its surrounding un-searched pixels, e.g. adjacent 8 pixels, and the second searching block 241 corresponded to the fourth reference point 242 is compared with the second reference searching block 221 so as to find a fourth optimal searching block which has a corresponding fourth reference point 242, e.g. pixel 247 shown in FIG. 11b. The pixel 247 is served as the last optimal reference point (step C5) and this step needs to search and compare for 9 times. In this embodiment, it is necessary to search and compare only for 25+9=34 times. Finally, calculate a distance between the last optimal searching point (pixel 247) and the second reference point 222 to be served as the displacement (step B7). In this manner, searching and comparison times can also be significantly decreased so as to increase the calculating speed of the displacement. In addition, other procedures are similar to that of the method for detecting displacement with sub-pixel accuracy shown in FIG. 5 and they will not be described herein in detail.

As mentioned above, in the present disclosure more than one sub-pixels may be interpolated between two pixels in the array images captured by the image capturing unit 102 so as to improve the accuracy of detecting displacement, e.g. one sub-pixel interpolation has half-pixel accuracy, three sub-pixels interpolation has quarter-pixel accuracy. However, when a number of interpolated sub-pixels is increased, the data amount of storage and calculation is significantly increased at the same time. Therefore, the method of detecting displacement with sub-pixel accuracy of the present disclosure may previously determine a predetermined portion in the array images captured by the image capturing unit 102 according to at least one previously calculated displacement, e.g. the immediately previous displacement. In other words, in the present disclosure only the predetermined portion of the array images captured by the image capturing unit 102 will be interpolated by the interpolation unit 103.

Figure 12:
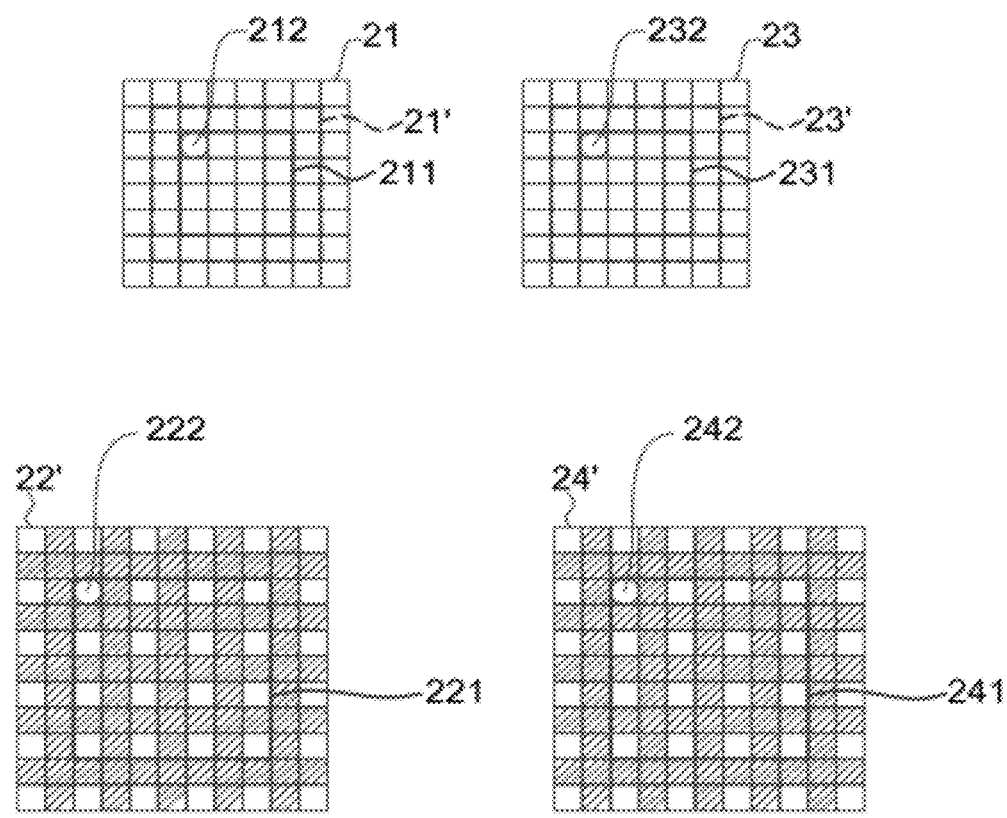
FIG. 12 shows a schematic diagram of the interpolation used in the method of detecting displacement with sub-pixel accuracy according to an alternative embodiment of the present invention.

For example please refer to FIG. 12, it shows a schematic diagram of the interpolation used in the method of detecting displacement with sub-pixel accuracy according to an alternative embodiment of the present disclosure. Please refer to FIGS. 2, 3 and 12, in the interpolation process of this embodiment, the image capturing unit 102 captures light from the surface "S" at a first time to form a first array image 21 (e.g. an array image having 8×8 pixels), and a central area of the first array image 21 having 4×4 pixels is defined as a first reference searching block 211 and a pixel at the top-left corner of the first reference searching block 211 is defined as a first reference point 212. The processing unit 105 determines a first predetermined portion 21' in the first array image 21 (e.g. an image area having 6×6 pixels) according to previously calculated displacement. The first predetermined portion 21' is then interpolated by the interpolation unit 103, for example, according to equation (1) to interpolate at least one sub-pixel. It is appreciated that all values used in the present embodiment are only exemplary.

A reference image 22' is obtained after the interpolation of the first predetermined portion 21'. In this embodiment, the reference image 22' contains a plurality of non-interpolated pixels having gray pixel values identical to those pixels in the first predetermined portion 21' (blank pixels shown in FIG. 12), and a plurality of interpolated pixels which are referred to the sub-pixels herein (e.g. pixels filled with oblique lines shown in FIG. 12). The first reference searching block 211 is converted to a second reference searching block 221 of 7×7 pixels after the interpolation and a pixel at the top-left corner of the second reference searching block 221 is defined as a second reference point 222.

The image capturing unit 102 captures light reflected from the surface "S" at a second time to form a second array image 23. The processing unit 105 determines a second predetermined portion 23' in the second array image 23 (e.g. an image area having 6×6 pixels) according to previously calculated displacement. The second predetermined portion 23' is interpolated by the interpolation unit 103 to form a comparison image 24', and the interpolation process is identical to that of forming the reference image 22'. Similarly, the comparison image 24' contains a plurality of non-interpolated pixels having gray pixel values identical to those pixels in the second predetermined portion 23' (e.g. blank pixels shown in FIG. 12), and a plurality of interpolated pixels which are referred to the sub-pixels herein (e.g. pixels filled with oblique lines shown in FIG. 12). The processing unit 105 defines a first searching block 231 in the second array image 23 which has the same pixel area as the first reference searching block 211, and defines a third reference point 232 in the first searching block 231 with a position corresponding to that of the first reference point 212 in the first reference searching block 211. The processing unit 105 further defines a second searching block 241 in the comparison image 24' which has the same pixel area as the second reference searching block 221, and defines a fourth reference point 242 in the second searching block 241 with a position corresponding to that of the second reference point 222 in the second reference searching block 221. It should be noted that, the position of the first reference point 212 in the first reference searching block 211, the position of the second reference point 222 in the second reference searching block 221, the position of the third reference point 232 in the first searching block 231 and the position of the fourth reference point 242 in the second searching block 241 are not limited to this embodiment, and each reference point may be any point inside its corresponding block.

In other words, the difference between this embodiment and FIG. 4 is that a predetermined portion in the associated array image is previously determined according to previously calculated displacement. In this manner, when the number of sub-pixels interpolated between two pixels in the array images captured by the image capturing unit 102 is increased, it is able to effectively decrease the data amount of storage and calculation and to improve the accuracy of detecting displacement.

Figure 13:
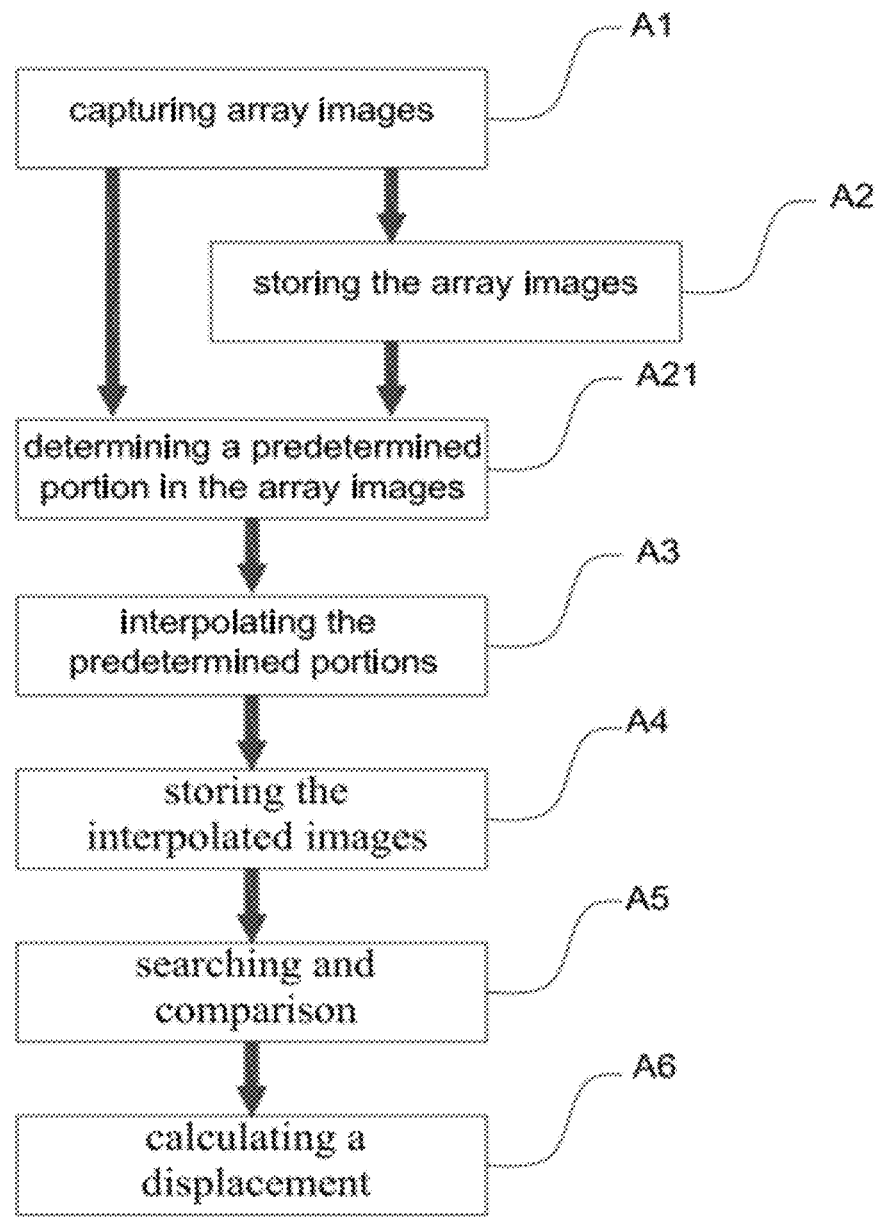
FIG. 13 shows a flow chart of the method of detecting displacement with sub-pixel accuracy according to an alternative embodiment of the present invention.

Please refer to FIG. 13, it shows a flow chart of the method of detecting displacement with sub-pixel accuracy according to an alternative embodiment of the present disclosure. The method includes the steps of: capturing a plurality of array images (Step A1); storing the plurality of array images (Step A2); determining a predetermined portion in the array images respectively (Step A21); interpolating the predetermined portions (Step A3); storing the interpolated images (Step A4); searching and comparison (Step A5); and calculating a displacement (Step A6). Details of this embodiment are similar to those of FIG. 5 and associated illustrations but different from that in this embodiment only the previously determined predetermined portion of the array images are interpolated in the interpolation process rather than the whole array images.

Figure 11:
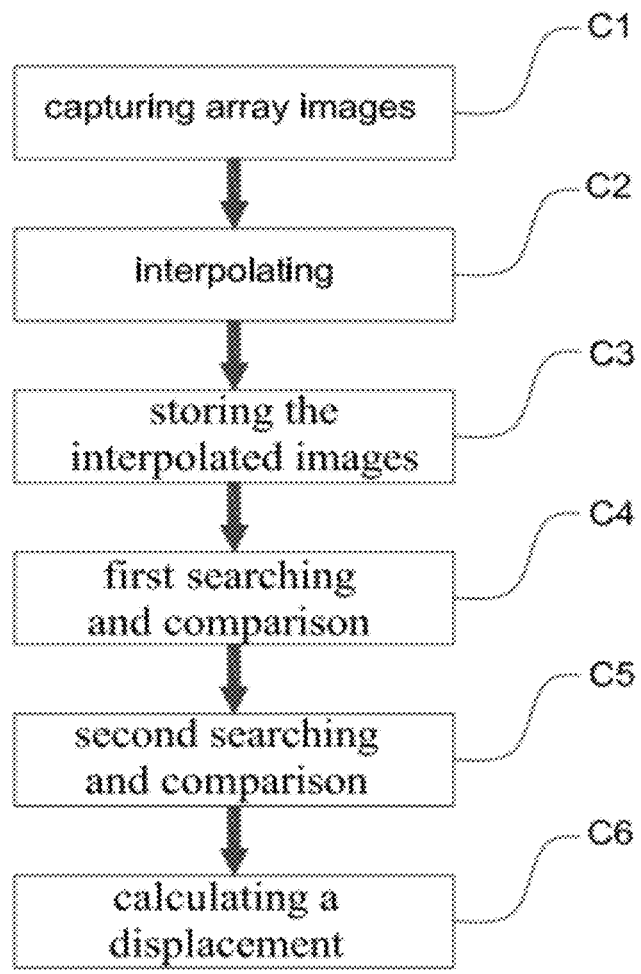
FIG. 11 shows a flow chart of another method for fast detecting displacement with sub-pixel accuracy according to the embodiment of the present invention.
Figure 11A:
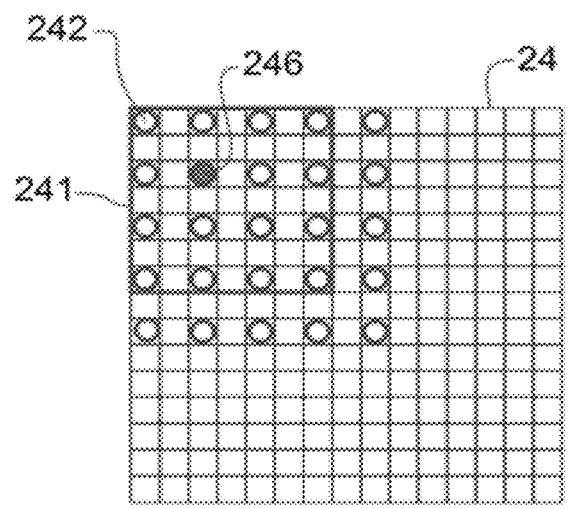
FIG. 11a shows a schematic view of the first searching points of another method for fast detecting displacement with sub-pixel accuracy according to the embodiment of the present invention, wherein the first searching needs 25 times.
Figure 11B:
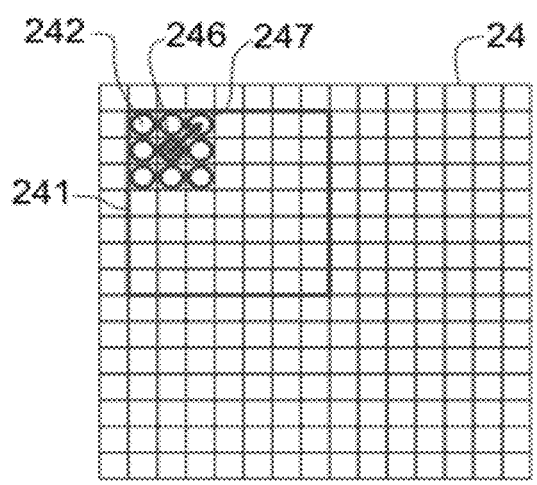
FIG. 11b shows a schematic view of the second searching points of another method for fast detecting displacement with sub-pixel accuracy according to the embodiment of the present invention, wherein the second searching needs 9 times.

Similarly, in the embodiments related to FIGS. 10 and 11, it is also able to previously select a predetermined portion in the array images according to previously calculated displacement and to interpolate only the predetermined portion so as to effectively decrease the data amount of storage and calculation. For example, in the Step B4 of FIG. 10 only a predetermined portion of the first array image 21 and the second array image 23 (e.g. the first predetermined portion 21' and the second predetermined portion 23') is respectively interpolated instead of the whole first array image 21 and second array image 23. Similarly, in the Step C2 of FIG. 13 only a predetermined portion of the first array image 21 and a predetermined portion of the second array image 23 (e.g. the first predetermined portion 21' and the second predetermined portion 23') are interpolated respectively instead of the whole first array image 21 and second array image 23. Since this alternative embodiment differs from FIGS. 10 and 11 only in the step of interpolating and is similar thereto in other steps, details of other steps will not be repeated herein.

In an alternative embodiment, the image arrays captured by the image capturing unit 102 may be filtered at first and then be interpolated by the interpolation unit 103 to form the reference image and the comparison image respectively. Next, the filtered reference image and comparison image are quantized as a quantized reference image in which each pixel has one of at least two values and a quantized comparison image, and finally the displacement of the optical navigation device with respect to the surface "S" may be obtained according to the digitized reference image and the digitized comparison image.

As described above, since the conventional method calculating movement based on Taylor Expansion has larger error when the movement becomes larger, it has the problem of unable to estimate the movement correctly. The method and apparatus for detecting displacement with sub-pixel accuracy of the present can increase the searching area by means of interpolation and improve the image resolution.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A method of detecting displacement with sub-pixel accuracy for detecting a displacement of an optical navigation device with respect to a surface on which the optical navigation device is disposed, the optical navigation device comprising an image capturing unit, an interpolation unit and a processing unit, the method comprising:
    moving the optical navigation device on the surface and capturing a first array image and a second array image with the image capturing unit;
    interpolating a first predetermined portion of the first array image to form a reference image with the interpolation unit;
    interpolating a second predetermined portion of the second array image to form a comparison image with the interpolation unit; and
    comparing the reference image with the comparison image by using the processing unit so as to obtain the displacement of the optical navigation device with respect to the surface.

2. The method of detecting displacement with sub-pixel accuracy as claimed in claim 1, wherein the interpolating process is implemented according to the following equation:

$$x[2m+p,2n+q]=(1-t)\times(1-u)\times x[2m,2n]+t\times(1-u)\times x[2m+2,2n]+(1-t)\times u\times x[2m,2n+2]+t\times u\times x[2m+2,2n+2],$$

where $(t,u)=(p/2,q/2)$; $0\leq p\leq 2$ and $0\leq q\leq 2$;
wherein [m,n] is the pixel coordinate of the first array image and the second array image before the interpolating process; [2 m+p,2n+q] is the interpolated pixel coordinate of the reference image and the comparison image after the interpolating process; x[2m+p,2n+q], x[2m,2n], x[2m+2,2n], x[2m,2n+2] and x[2m+2,2n+2] are gray level values or brightness values of corresponding pixel coordinates.

3. The method of detecting displacement with sub-pixel accuracy as claimed in claim 1, wherein the step of comparing the reference image with the comparison image by using the processing unit further comprises:
    defining a reference searching block and a second reference point in the reference image, wherein the reference searching block has a predetermined pixel area and the second reference point is a pixel inside the predetermined pixel area;
    defining a searching block and a fourth reference point in the comparison image, wherein the searching block has the same pixel area as the reference searching block and a position of the fourth reference point in the searching block corresponds to that of the second reference point in the reference searching block;
    successively searching all pixels of the comparison image with the searching block and simultaneously comparing the searching block with the reference searching block so as to obtain an optimal searching block; and
    calculating a distance between the fourth reference point of the optimal searching block and the second reference point to be served as the displacement.

4. The method of detecting displacement with sub-pixel accuracy as claimed in claim 3, wherein said comparing the searching block with the reference searching block is to calculate differences in gray level value between every pixels in the searching block and the pixels at corresponding positions in the reference searching block, and to calculate a sum of the absolute values of all the differences.

5. The method of detecting displacement with sub-pixel accuracy as claimed in claim 4, wherein the optimal searching block is the searching block having the smallest sum of the absolute values of all the differences when comparing the searching block with the reference searching block.

6. A method of detecting displacement with sub-pixel accuracy for detecting a displacement of an optical navigation device with respect to a surface on which the optical navigation device is disposed, the optical navigation device comprising an image capturing unit, an interpolation unit and a processing unit, the method comprising:
 moving the optical navigation device on the surface and capturing a first array image and a second array image with the image capturing unit;
 performing a first searching and comparison in the second array image by using the processing unit;
 interpolating a first predetermined portion of the first array image to form a reference image with the interpolation unit;
 interpolating a second predetermined portion of the second array image to form a comparison image with the interpolation unit;
 performing a second searching and comparison in the comparison image by using the processing unit; and
 calculating the displacement of the optical navigation device with respect to the surface by using the processing unit.

7. The method of detecting displacement with sub-pixel accuracy as claimed in claim 6, wherein the step of performing a first searching and comparison in the second array image by using the processing unit further comprises:
 defining a first reference searching block and a first reference point in the first array image, wherein the first reference searching block has a predetermined pixel area and the first reference point is a pixel in the predetermined pixel area;
 defining a first searching block and a third reference point in the second array image, wherein the first searching block has the same pixel area as the first reference searching block and a position of the third reference point in the first searching block corresponds to that of the first reference point in the first reference searching block; and
 successively searching all pixels of the second array image with the first searching block and simultaneously comparing the first searching block with the first reference searching block so as to obtain a first optimal searching block.

8. The method of detecting displacement with sub-pixel accuracy as claimed in claim 7, wherein said comparing the first searching block with the first reference searching block is to calculate differences in gray level value between every pixels in the first searching block and the pixels at corresponding positions in the first reference searching block, and to calculate a sum of the absolute values of all the differences.

9. The method of detecting displacement with sub-pixel accuracy as claimed in claim 8, wherein the first optimal searching block is the first searching block having the smallest sum of the absolute values of all the differences when comparing the first searching block with the first reference searching block.

10. The method of detecting displacement with sub-pixel accuracy as claimed in claim 7, wherein the step of performing a second searching and comparison in the comparison image by using the processing unit further comprises:
 defining a second reference searching block and a second reference point in the reference image, wherein the second reference searching block has a predetermined pixel area and the second reference point is a pixel inside the predetermined pixel area;
 defining a second searching block and a fourth reference point in the comparison image, wherein the second searching block has the same pixel area as the second reference searching block and a position of the fourth reference point in the second searching block corresponds to that of the second reference point in the second reference searching block; and
 successively searching the third reference point and a predetermined searching area surrounding the third reference point in the first optimal searching block with the fourth reference point, and simultaneously comparing the second searching block corresponded to the fourth reference point with the second reference searching block so as to obtain a second optimal searching block.

11. The method of detecting displacement with sub-pixel accuracy as claimed in claim 10, wherein the method to compare the second searching block with the second reference searching block is to calculate differences in gray level value between every pixels in the second searching block and the pixels at corresponding positions in the second reference searching block, and to calculate a sum of the absolute values of all the differences.

12. The method of detecting displacement with sub-pixel accuracy as claimed in claim 11, wherein the second optimal searching block is the second searching block having the smallest sum of the absolute values of all the differences when comparing the second searching block with the second reference searching block.

13. The method of detecting displacement with sub-pixel accuracy as claimed in claim 10, wherein the method to calculate the displacement by using the processing unit is to calculate a distance between the fourth reference point of the second optimal searching block and the second reference point.

14. The method of detecting displacement with sub-pixel accuracy as claimed in claim 10, wherein the predetermined searching area comprises the pixels surrounding the third reference point of the first optimal searching block in the comparison image.

15. A method of detecting displacement with sub-pixel accuracy for detecting a displacement of an optical navigation device with respect to a surface on which the optical navigation device is disposed, the optical navigation device comprising an image capturing unit, an interpolation unit and a processing unit, the method comprising:
 moving the optical navigation device on the surface and capturing a first array image and a second array image with the image capturing unit;
 interpolating a first predetermined portion of the first array image to form a reference image with the interpolation unit;
 interpolating a second predetermined portion of the second array image to form a comparison image with the interpolation unit;
 performing a first searching and comparison in the comparison image by using the processing unit;
 performing a second searching and comparison in the comparison image by using the processing unit; and
 calculating the displacement of the optical navigation device with respect to the surface by using the processing unit.

16. The method of detecting displacement with sub-pixel accuracy as claimed in claim 15, wherein the step of performing a first searching and comparison in the comparison image by using the processing unit further comprises:
- defining a reference searching block and a second reference point in the reference image, wherein the reference searching block has a predetermined pixel area and the second reference point is a pixel inside the predetermined pixel area;
- defining a searching block and a fourth reference point in the comparison image, wherein the searching block has the same pixel area as the reference searching block and a position of the fourth reference point in the searching block corresponds to that of the second reference point in the reference searching block; and
- successively searching predetermined pixels in the comparison image with the fourth reference point and simultaneously comparing the searching block corresponded to the fourth reference point with the reference searching block so as to obtain a first optimal searching block.

17. The method of detecting displacement with sub-pixel accuracy as claimed in claim 16, wherein the method to compare the searching block with the reference searching block is to calculate differences in gray level value between every pixels in the searching block and the pixels at corresponding positions in the reference searching block, and to calculate a sum of the absolute values of all the differences.

18. The method of detecting displacement with sub-pixel accuracy as claimed in claim 17, wherein the first optimal searching block is the searching block having the smallest sum of the absolute values of all the differences when comparing the searching block with the reference searching block.

19. The method of detecting displacement with sub-pixel accuracy as claimed in claim 16, wherein the step of performing a second searching and comparison further comprises:
- successively searching the fourth reference point and a predetermined searching area surrounding the fourth reference point in the first optimal searching block with the fourth reference point, and simultaneously comparing the searching block corresponded to the fourth reference point with the reference searching block so as to obtain a second optimal searching block.

20. The method of detecting displacement with sub-pixel accuracy as claimed in claim 19, wherein said comparing the searching block with the reference searching block is to calculate differences in gray level value between every pixels in the searching block and the pixels at corresponding positions in the reference searching block, and to calculate a sum of the absolute values of all the differences.

21. The method of detecting displacement with sub-pixel accuracy as claimed in claim 20, wherein the second optimal searching block is the searching block having the smallest sum of the absolute values of all the differences when comparing the searching block with the reference searching block.

22. The method of detecting displacement with sub-pixel accuracy as claimed in claim 19, wherein the method to calculate the displacement by using the processing unit is to calculate a distance between the fourth reference point of the second optimal searching block and the second reference point.

23. The method of detecting displacement with sub-pixel accuracy as claimed in claim 19, wherein the predetermined searching area comprises the unsearched pixels adjacent to the fourth reference point of the first optimal searching block in the comparison image.

24. An optical navigation device for detecting displacement with sub-pixel accuracy, comprising:
- an imaging capturing unit for capturing a first array image and a second array image of a surface on which the optical navigation device is moving;
- an interpolation unit for interpolating a predetermined portion of the first array image and the second array image to respectively form a reference image and a comparison image;
- a storage unit for storing the first array image, the second array image, the reference image and the comparison image; and
- a processing unit for comparing the first array image with the second array image, and/or comparing the reference image with the comparison image so as to obtain a displacement of the optical navigation device with respect to the surface,
  wherein the processing unit is configured to
  define a first reference searching block in the first array image and define a first searching block in the second array image, and then
  successively search all pixels in the second array image with the first searching block and compare the first reference searching block with the first searching block so as to obtain a smallest sum of absolute values of all the differences in gray level value between every pixels in the first searching block and the pixels at corresponding positions in the first reference searching block to obtain the displacement, and/or is configured to
  define a second reference searching block in the reference image and define a second searching block in the comparison image, and then successively
  search all pixels in the comparison image with the second searching block and compare the second reference searching block with the second searching block so as to obtain a smallest sum of absolute values of all the differences in gray level value between every pixels in the second searching block and the pixels at corresponding positions in the second reference searching block to obtain the displacement.

* * * * *